Patented July 12, 1949

2,476,159

UNITED STATES PATENT OFFICE 2,476,159

FERMENTATION PROCESS

Leonard B. Schweiger and Raymond L. Snell, Elkhart, Ind., assignors to Miles Laboratories, Inc., Elkhart, Ind., a corporation of Indiana No Drawing. Application July 16, 1948, Serial No. 39,173

9 Claims. (Cl. 195—36)

This invention relates, generally, to improvements in the production of citric acid by oxidative, submerged fermentation of carbohydrates under the action of a citric acid producing strain of *Aspergillus niger*. More particularly, the invention relates to such a method of producing citric acid wherein both ammonium carbonate and morpholine are present in the basal medium.

In our previous application, Serial No. 741,108, filed April 12, 1947, to which reference is hereby made, we have disclosed a method, and suitable apparatus, for producing citric acid by oxidative, submerged fermentation of carbohydrate material under the action of *A. niger* using ammonium carbonate as the source of nutrient nitrogen. We have now found that our previous process may be materially improved, particularly with respect to increased yields of citric acid, by having both ammonium carbonate and morpholine present in the media undergoing fermentation.

The object of the invention, generally stated, is the provision of an improved method of producing citric acid by oxidative, submerged fermentation of assimilable carbohydrate materials under the action of citric acid producing strains of *A. niger*, and in the presence of suitable nutrient compounds, including both ammonium carbonate and morpholine in certain optimum concentrations.

Certain other objects of the invention will, in part, be obvious and will, in part, appear hereinafter.

The following specific examples illustrate three presently preferred embodiments of the invention. It will, of course, be understood that these examples are given by way of illustration, and that other embodiments of the invention may be adopted without departing from the spirit and scope thereof.

EXAMPLE I

An aqueous solution of the following composition was prepared:

Composition A

| | per cent by weight |
|---|---|
| Ammonium carbonate | 0.2 |
| $KH_2PO_4$ ----do---- | 0.014 |
| $MgSO_4.7H_2O$ ----do---- | 0.1 |
| Refined sugar ----do---- | 13.1 |
| Decationized well water, q. s. | .4 liters |

500 P. P. M. (.05%) of morpholine were added to Composition A and its pH value was adjusted to approximately 2.5 by addition of concentrated hydrochloric acid, and it was then introduced into a column type fermenter in the form of a Pyrex column having an inside diameter of three inches and a length of forty-eight inches. This type of apparatus is shown in Figure 2 of the drawings forming a part of said application, Serial No. 741,108. As a precaution, the fermenting apparatus before use was previously sterilized with steam for a period of 2–3 hours. The medium was sterilized in a Pyrex container by placing the container in an autoclave and introducing steam at 10 pounds per square inch. After a period of about twenty minutes the container and its contents were cooled to approximately room temperature.

The sterilized medium was next introduced into the sterile fermenter and inoculated with a spore suspension of a strain of *A. niger* identified as $18B_2$ and characterized by its good acid producing ability. The spore suspension was prepared by washing three to six day old growth from agar slants with sterile distilled water. Sufficient spore suspension was used to give a spore concentration in the basal medium of approximately 50–100 million spores per liter, as determined by the hemocytometer or Lumatron methods.

Sterile humidified air at a temperature of about 35° C. was passed through the column at a rate of approximately 4 liters per minute and the fermentation process was continued for nine and two-thirds days with the temperature of the medium being maintained at 30–32° C.

At the end of this time, fermentation was discontinued and the contents of the fermenter were withdrawn and the citric acid recovered therefrom by precipitation in the form of calcium citrate, in accordance with known procedure. In terms of citric acid produced, the fermentation resulted in the production of 384 grams of citric acid. Based on the initial amount of refined sugar in the medium, this amount of citric acid represents a 77.1% conversion of the initial sugar to the acid. Approximately 30 grams of unconsumed sugar remained in the fermented medium, so that based on the amount of sugar consumed, 94% thereof was converted to citric acid. No detectable amount of oxalic acid was produced during the fermentation.

EXAMPLE II

The following medium for fermentation was prepared using a well water decationized by passage through a cation exchange resin operating on the hydrogen cycle, such, for example, as the phenol formaldehyde type cation exchange resin sold under the trade name "Amberlite IR–1":

Composition B

| | per cent by weight |
|---|---|
| Ammonium carbonate | 0.2 |
| $KH_2PO_4$ ----do---- | 0.014 |
| $MgSO_4.7H_2O$ ----do---- | 0.1 |
| Refined sugar ----do---- | 12.0 |
| Decationized well water, q. s. | .4 liters |

1000 P. P. M. (.1%) of morpholine were added to Composition B and it was fermented in the apparatus, and in accordance with the procedure described above in connection with Example I, except that the fermentation was allowed to run only eight and two-thirds days. The quantity of citric acid produced was 309 grams, which amount constitutes a 61.8% conversion of the initial sugar present in the medium and a 93.1% conversion of the sugar consumed.

EXAMPLE III

The following medium for fermentation was prepared by known decationization techniques:

*Composition C*

| | |
|---|---|
| Ammonium carbonate | percent by weight__ 0.2 |
| $KH_2PO_4$ | do____ 0.014 |
| $MgSO_4.7H_2O$ | do____ 0.1 |
| Decationized raw sugar | do____ 12.8 |
| Decationized well water, q. s. | .4 liters |

500 P. P. M. (0.05%) morpholine were added to Composition C and it was then fermented in the apparatus, and in accordance with the procedure described under Example I, except that the fermentation was discontinued after 8⅔ days. 79.9% of the initial sugar was converted to citric acid.

EXAMPLE IV

The fermentation of Example III was repeated using 13.5% decationized corn syrup instead of the decationized raw sugar. The corn syrup was decationized in one pass and then diluted to contain 13.5% fermentable carbohydrate. 61.5% of the initial fermentable material was converted to citric acid.

The results of Examples III and IV show that such relatively inexpensive ash-containing raw materials as raw sugar and corn syrup, can satisfactorily be substituted for refined sugar as substrates for citric acid production, especially if such raw materials are first suitably conditioned for this purpose by decationization.

EXAMPLE V

In order to demonstrate that the excellent yields of citric acid obtained in the relatively small scale fermentations of the previous examples, were reproducible on a commercial scale, fermentations in accordance with the present invention were conducted in a pilot plant using a column type fermenter approximately 24 feet high with a diameter of about 19 inches. In one such fermentation 275 gallons of medium having the following composition were fermented:

| | Percent by weight |
|---|---|
| Ammonium carbonate U. S. P. | 0.2 |
| $KH_2PO_4$ | 0.014 |
| $MgSO_4.7H_2O$ U. S. P. | 0.1 |
| Morpholine | 0.05 |
| Refined sugar | 13.0 |
| $Zn^{++}$, .1–.4 P. P. M. | |
| pH=2.5–2.6 with HCl. | |

The aeration rate was 8–10 C. F. M., or .218–.272 vol. air/vol. media/min. Inoculation was made with a suspension of spores of *A. niger*, 18B₂, grown on Sabourand's agar base medium in seven Blake (penicillin) bottles for 21 days. The density of the suspension, determined by alkaline extraction of the spore pigment and spectrophotometric determination of the optical density indicated a spore concentration of .214 spore chromogen units per ml. of media after inoculation. This is equivalent to a spore density in the final medium of 75,000–80,000 spores per ml.

At the end of 8⅔ days of fermentation, the medium was harvested, yielding the following data:

| | | |
|---|---|---|
| Media volume | gal__ | 275 |
| Initial sugar, wt. | lbs__ | 298.5 |
| Residual sugar, conc. | percent__ | 3.75 |
| Residual sugar, wt | lbs__ | 86.2 |
| Titrable acidity, as citric | percent__ | 8.61 |
| Oxalic acid | | Negative |
| Total acid, wt | lbs__ | 198 |
| Sugar consumed | lbs__ | 212.3 |
| Percent conversion of original sugar (yield) | | 66.5% |
| Percent conversion of consumed sugar (efficiency) | | 93.5% |

In each of the fermentations carried out under the foregoing examples, the cellular morphology was so controlled as to induce cell structure characterized by:

a. Abnormally short, stubby, forked, bulbous mycelium.
b. Numerous swollen, oval to spherical-shaped cells well distributed throughout the mycelial structure.
c. Mycelial structures all showing granulations, and numerous vacuoles or refractile bodies.
d. Absence of normal reproductive bodies (vesicles or sterigmata).
e. Formation of compact aggregates or colonies having a gross granular appearance and of sizes under 0.5 mm. in cross section and averaging about 0.1 mm.

The photomicrographs shown in Figures 3, 4 and 5 of said application, Serial No. 741,108, show cell structure having the above characteristics.

The mycelium in each instance was non-slimy, and of a granular nature permitting ready separation from the substrate, by filtration.

The three following tables present data showing the effect of varying concentrations of morpholine on citric acid production:

TABLE I

*Effect of varying concentrations of morpholine on citric acid production (using A. Niger 18B₂)*

| Basal Media, Per cent | Conc. of Morpholine, P. P. M. | Acidity,[1] g. | Per cent Sugar Conversion | |
|---|---|---|---|---|
| | | | Initial[1] | Consumed |
| A. Composition A | 0.0 | 313.0 | 62.4 | 87.7 |
| B. Composition A | 10.0–.001% | 324.0 | 64.5 | 87.2 |
| C. Composition A | 50.0–.005% | 307.0 | 61.2 | 87.2 |
| D. Composition A | 100.0–.01% | 375.0 | 75.3 | 89.9 |
| E. Composition A | 500.0–.05% | 384.0 | 77.1 | 94.0 |

[1] Total acidity in 9⅔ days fermentation.

TABLE II

*Effect of varying concentrations of morpholine on citric acid production (using A. Niger 18B₂)*

| Basal Media, Per cent | Conc. of Morpholine, P. P. M. | Acidity,[1] g. | Per cent Sugar Conversion | |
|---|---|---|---|---|
| | | | Initial[1] | Consumed |
| A. Composition B | 0.0 | 294.0 | 58.8 | 83.3 |
| B. Composition B | 500.0 | 334.0 | 66.8 | 93.8 |
| C. Composition B | 1000.0 | 309.0 | 61.8 | 93.1 |

[1] Total acidity in 8⅔ days fermentation.

TABLE III

*Effect of morpholine on citric acid production (using A. niger 18B₂)*

| Basal Media, Per cent by weight | Conc. of Morpholine, P. P. M. | Acidity,¹ g. | Per cent Sug. Conv. | | Residual Sugar, g. |
|---|---|---|---|---|---|
| | | | Initial | Consumed | |
| A. Ammonium Carbonate, 0.2<br>KH₂PO₄, 0.014<br>MgSO₄.7H₂O, 0.1<br>Sucrose, 12.8<br>Decationized well Water, q. s.—4 l. | 0.0 | 365.0 | 74.0 | 88.0 | 78 |
| B. Same as A | 500.0 | 389.0 | 80.4 | 95.6 | 77 |

¹ Total acidity in 9⅔ days fermentation.

From the foregoing data, it appears that the morpholine concentration may effectively range from 100 to 1000 P. P. M., with 500 P. P. M. being an approximate optimum concentration.

Table IV below contains data showing that the improved effect of morpholine is not restricted to a single strain of *A. niger*. Strain No. 139 was obtained by ultraviolet irradiation of spore suspensions of strain 18B₂. The spores of strain No. 139 are tan, whereas the spores of the current 18B₂ are jet black.

TABLE IV

*Effect of morpholine on citric acid production by Aspergillus niger 18B₂ and Aspergillus niger 139*

| Basal Media, Per cent by weight | Organism | Conc. of Morpholine, P. P. M. | Acidity,¹ g. | Per cent Sugar Convers. | |
|---|---|---|---|---|---|
| | | | | Initial | Consumed |
| A. NH₄CO₃, 0.2<br>KH₂PO₄, 0.014<br>MgSO₄, 0.1 | 18B₂ | 500.0 | 347.0 | 70.5 | 98.0 |
| | 18B₂ | 0 0. | 255.0 | 51.5 | 82.5 |
| Refined sugar, 12.7<br>Well Water, q. s.—4 l. | 139 | 500.0 | 326.0 | 66.5 | 97.3 |
| | 139 | 0.0 | 253.0 | 51.4 | 83.0 |

¹ Total acidity in 7⅔ days fermentation.

An experiment was performed to determine the effect of different concentrations of morpholine and ammonium carbonate on citric acid yields. The procedure and apparatus described under Example I above were adopted in performing this experiment. Different concentrations of morpholine and ammonium carbonate, and mixtures thereof, were added to a basal refined sugar medium containing 0.14% KH₂PO₄ and 0.1% Mg₄SO.7H₂O, and inoculated with spores of *A. niger*, 18B₂. The following table shows the results of 5⅔ days of fermentation under this experiment:

Table V

*Effect of various concentrations of morpholine and ammonium carbonate on citric acid yields*

| | (NH₄)₂CO₃, Percent | Morpholine, Percent | Acidity, g. | Percent Sugar Conversion | |
|---|---|---|---|---|---|
| | | | | Initial | Consumed |
| a | 0.20 | 0.00 | 190 | 38.0 | 84.1 |
| b | 0.20 | 0.05 | 246 | 49.2 | 96.1 |
| c | 0.05 | 0.10 | 95 | 19.0 | 89.6 |
| d | 0.00 | 0.20 | 0 | 0.0 | 0.0 |
| e | 0.00 | 0.10 | 0 | 0.0 | 0.0 |

In fermentations *d* and *e*, having morpholine as the sole source of nitrogen, mycelial growth was scanty, abnormal in cellular morphology (when compared with the cell structure shown in Figures 3, 4 and 5 of said application, Serial No. 741,108, as normal), and produced no citric acid. When morpholine was used as the major source of nutrient nitrogen, but was supplemented with 0.05% ammonium carbonate (viz. fermentation *c*), growth was still abnormal but some acidity was produced. Ammonium carbonate alone (viz. fermentation *a*) produced a good yield of acid for the fermentation period involved, but the yield was enhanced greatly when 0.2% ammonium carbonate was used as the major nitrogen source supplemented with 0.05% morpholine (viz. fermentation *b*). It is apparent from the data contained in Table V that morpholine and ammonium carbonate, in proper concentrations, produce some associated effect on the yield of citric acid by *A. niger*.

As pointed out above, the morpholine may range in concentration from 100 to 1000 P. P. M. with approximately 500 P. P. M. being optimum. Experience has shown that the ammonium carbonate concentration may range between approximately 0.2–0.15%. (The chemical which is commonly known as ammonium carbonate is actually a mixture of ammonium bicarbonate and ammonium carbamate and contains approximately 30–34% by weight of ammonia and approximately 45% $CO_2$.) The KH₂PO₄ may range from 0.01 to 0.02% and the MgSO₄.7H₂O may range from 0.08 to 0.15% by weight. The fermentable carbohydrate or sugar material may range in concentration from 10 to 15% by weight, with from 12 to 13% being the preferred range. Refined sugar may be used, or low-ash containing sugar materials, such as raw sugar, corn syrup or high-test molasses may be used. These latter materials, for good results, must be decationized so as to reduce the Fe concentration to not more than about 1 P. P. M. The pH value of the basal media may range between 2.5 and 2.6. No more than one part per million of Fe should be present, and if it is present, the $Zn^{++}$ should range in concentration between .00005% and .001%, so as to counteract the effect of the Fe on the cell morphology.

The above data shows that morpholine in the presence of ammonium carbonate has the following important effects on citric acid production in the submerged state:

1. Increases the conversion of initial carbohydrate, with as high as 80% conversions being obtained in practical fermentation times of 8–10 days.

2. Produces increased efficiency of fermentation, that is, of the subtrate consumed, a higher precent is converted to citric acid.

3. Stimulates early germination of spores, resulting in a faster rate of acid production in the early stages of fermentation.

4. Contributes a stabilizing effect on the physiological characteristics of the fungus, permitting better duplication of results.

At the present time, we are not able completely to elaborate the role played by the morpholine. It is postulated that the morpholine may serve as a supplementary nitrogen source which requires more energy for its utilization, thus placing a greater requirement on the physiological mechanism of the fungus.

The fermentations may be carried out in tank type fermenters, such as the one shown in Figure 1 of said application Serial No. 741,108. In fact, the particular type and construction of the fermenters which may be used are not critical.

Sterile, humidified air is the preferred aerating medium. However, if economically feasible, other oxygen-containing gases may be used. Foaming in the fermenters may be controlled by addition to the contents of suitable antifoam agents, such as, octadecyl alcohol in mineral oil or Tween 81.

Numerous modified techniques may be adopted in carrying out fermentations according to our invention. Thus, additional amounts of the sugar material may be added during the course of the fermentations. Instead of adding the spore suspensions directly to the basal media, mycelial mats may first be grown in a similar media and then macerated and added to the contents of a fermenter. Likewise, preformed submerged cells may be developed and used with a view toward reducing or eliminating the incubation period for the spores in the fermenters.

In view of the foregoing disclosure, those skilled in the art will be able advantageously to practice the invention, as well as make certain further modifications in the specific embodiments described above. Accordingly, the scope of the invention is to be limited only within the limits defined in the appended claims.

We claim:

1. In the production of citric acid by submerged oxidative fermentation of assimilable carbohydrate-containing media with a citric acid producing strain of *A. niger,* the improvement which comprises incorporating ammonium carbonate and morpholine in the media.

2. A method of producing citric acid by submerged fermentation, which comprises, subjecting a sugar material to the action of a citric acid producing strain of *A. niger* in an agitated, aqueous solution containing in addition to said sugar material nutrient mineral substances and ammonium carbonate and morpholine, and passing an oxygen-containing gas through said solution.

3. A method of producing citric acid by submerged fermentation, which comprises, subjecting a sugar material to the action of a citric acid producing strain of *A. niger* in an agitated, aqueous solution containing in addition to said sugar material nutrient mineral substances and, from about 0.1 to 0.3% by weight of ammonium carbonate, and from 100–1000 P. P. M. of morpholine, and passing an oxygen-containing gas through said solution.

4. The process of claim 3 wherein said oxygen-containing gas is air.

5. A method of producing citric acid by submerged fermentation, which comprises, subjecting a sugar material to the action of a citric acid producing strain of *A. niger* in an agitated aqueous solution of said sugar material having a pH of about 2.5–2.6 and containing from about 0.1 to 0.3% by weight of ammonium carbonate and from about 100–1000 P. P. M. of morpholine as well as nutrient concentrations of $KH_2PO_4$ and $MgSO_4.7H_2O$, and passing an oxygen-containing gas in finely dispersed condition through said solution.

6. The method called for in claim 5 wherein said $KH_2PO_4$ phosphate has a concentration from about 0.01% to 0.02% and said $MgSO_4.7H_2O$ has a concentration from about .08 to .15%.

7. A method of producing citric acid by submerged fermentation, which comprises, subjecting a sugar material to the action of a citric acid producing strain of *A. niger* in an agitated aqueous solution having a pH of about 2.5–2.6 and containing about 12% by weight of refined sucrose, about 0.2% by weight of ammonium carbonate, about 500 P. P. M. of morpholine, about 0.014% by weight of $KH_2PO_4$ and about 0.1% of $MgSO_4.7H_2O$, and passing air in finely dispersed condition through said solution.

8. A method of producing citric acid by submerged fermentation which comprises subjecting a sugar material to the action of a citric acid producing strain of *A. niger* yielding a cell structure characterized by:

a. Abnormally short, stubby, forked, bulbous mycelium.

b. Numerous swollen, oval to spherical-shaped cells well distributed throughout the mycelial structure.

c. Mycelial structures all showing granulations, and numerous vacuoles or refractile bodies.

d. Absence of normal reproductive bodies (vesicles or sterigmata).

e. Formation of compact aggregates or colonies having a gross granular appearance and of sizes under 0.5 mm. in cross section and averaging about 0.1 mm.

in an agitated, aqueous solution of said sugar material having a pH of about 2.5–2.6 and containing from about 0.1–0.3% by weight of ammonium carbonate and from about 500–1000 P. P. M. of morpholine, as well as nutrient concentrations of $KH_2PO_4$ and $MgSO_4.7H_2O$, and passing air in finely dispersed condition through said solution.

9. A method of producing citric acid by submerged fermentation, which comprises, subjecting an ash-containing sugar material decationized to reduce the Fe content to not more than 1 P. P. M. to the action of a citric acid producing strain of *A niger* in an agitated aqueous solution containing in addition to said decationized sugar material nutrient mineral substances including from about .00005 to .001% Zn to counteract said Fe content, and ammonium carbonate and morpholine, and passing an oxygen-containing gas through said solution.

LEONARD B. SCHWEIGER.
RAYMOND L. SNELL.

No references cited.